Dec. 8, 1959     T. V. RYCHLEWSKI     2,916,394
PROCESSING OF IMAGE DISPLAY DEVICES
Filed May 6, 1958

INVENTOR
THADDEUS V. RYCHLEWSKI
BY
ATTORNEY

United States Patent Office 2,916,394
Patented Dec. 8, 1959

2,916,394

PROCESSING OF IMAGE DISPLAY DEVICES

Thaddeus V. Rychlewski, Seneca Falls, N.Y., assignor, by mesne assignments, to Sylvania Electric Products, Inc., Wilmington, Del., a corporation of Delaware Application May 6, 1958, Serial No. 733,315

8 Claims. (Cl. 117—33.5)

This invention relates to a process of fabricating screens for image display devices and more particularly to a process for making such devices employing vapor deposition techniques.

Generally, image display screens utilized in devices such as color picture tubes have been formed by chemical liquid settling processes or by photographic printing operations. These methods require a large number of detailed critical steps and necessitate the application of expensive equipment and materials.

Accordingly, it is an object of the invention to reduce the aforementioned disadvantages and to fabricate screens for display devices by the application of unique vaporization techniques.

A further object is the provision of a highly reliable non-critical, efficient process for making display screens.

The foregoing objects are achieved in one aspect of the invention by the provision of a unique process for making luminescent image display screens employing vaporization techniques. The desired luminescent material configurations which form the screen pattern are deposited on a viewing panel by vaporizing the luminescent materials from a substantially point source vapor generator. A vapor mask having appropriately formed apertures is disposed between the generator and the panel to mask certain areas of the panel. The generator is aligned relative to the mask and panel in one embodiment of the invention, e.g., while fabricating cathode ray color picture tubes, so that the point source generator will lie within the region of the center of deflection of the appropriate electron beam used in the picture tube.

This invention is applicable to the fabrication of screens for many types of display devices such as color pictures tubes of the cathode ray type, e.g., aperture mask, post grid deflection and/or focusing, indexing, etc., and for solid state devices such as electroluminescent panels where a prescribed pattern is desired. In each of these devices, one or more luminescent materials may be deposited on the viewing panel to form appropriately positioned luminescent configurations by vapor deposition. If desired, a fluxing agent may be evaporated along with the luminescent material. In addition, a luminescent material activator may be vaporized simultaneously with or subsequent to the luminescent material to aid in the promotion of the luminescence thereof.

The luminescent materials employed in the screen may be any conventional type of electric field and/or electron, ion or photon responsive inorganic material such as the phosphors formed from sulfides, oxides, tungstates, aluminates, borates, selenides, phosphates or silicates of one or more metals consisting of zinc, cadmium, beryllium, magnesium, manganese, calcium, strontium and others well known in the art. These materials may be activated by metals such as silver, copper, manganese, gold and zinc or their salts.

The luminescent material fluxes which may be employed with the phosphors include salts like chlorides, bromides, iodides, sulfates, etc., of metals such as lithium, barium, sodium and potassium.

For a better understanding of the invention, reference is made to the following description taken in conjunction with the accompanying drawings in which.

Figure 1:
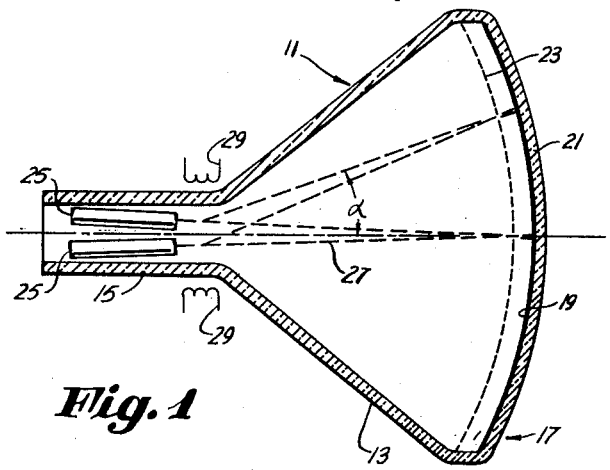
Fig. 1 is a plan view of a multiple beam cathode ray type image display color tube.

Fig. 1 shows a shadow mask type cathode ray color tube for purposes of illustrating the invention. The tube comprises an envelope 11 having a cone 13, neck portion 15 and a face panel assembly 17. A luminescent screen 19 is formed on face plate 21 of the assembly, and an aperture mask 23, which is also part of the assembly, is positioned in spaced relationship from screen 19. Mounted within neck portion 15 are a plurality of electron guns 25 which provide the source, acceleration, modulation and focusing for electron beams 27. Two of the three guns normally employed in this type of tube have been shown for simplicity. The electron beams projected from guns 25 are deflected by coils 29 to cause scanning of screen 19 and reproduction of the transmitted image. Generally, additional magnetic coils (not shown) are utilized in conjunction with coils 29 to provide dynamic convergence for beams 27 so that they will intersect at all deflection angles as they pass through the apertures in mask 23.

Figure 5:
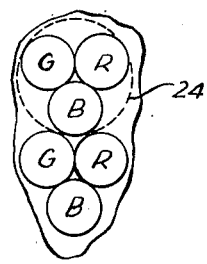
Fig. 5 illustrates a small section of a tri-dot color display screen.

Screen 19 comprises a large number of triads of red, green and blue, R, G and B respectively, color luminescing material configurations each formed as a discrete dot as shown in Fig. 5. An individual triad is associated with one aperture, illustrated by the numeral 24, in mask 23 so that one luminescent material dot in each triad will be impinged by a selected one of the beams 27 passing through the aperture during scanning.

The area within neck portion 15 of tube 11 which is surrounded by deflection coils 29 is generally known as the deflection region. For each individual beam, the center of deflection lies substantially along the static convergence axis shown by the undeflected beam positions in Fig. 1 and is within the deflection region of coils 29. For any given deflection angle alpha ($\alpha$), the beam appears to come from a position located substantially along this static beam convergence axis and lies within the region of coils 29. This position is known as the apparent center of deflection for a given beam at any deflection angle.

In order to properly position the luminescent dots relative to the apertures in mask 23 and to the appropriate electron gun 25, it is necessary to position the dots in such a manner that a dot is exposed through the associated aperture in mask 23 to the center of deflection of its electron beam at any given deflection angle. With this type of construction, the red luminescent dots, for instance, will only be exposed to the electron beam carrying the red signal modulation.

Figure 2:
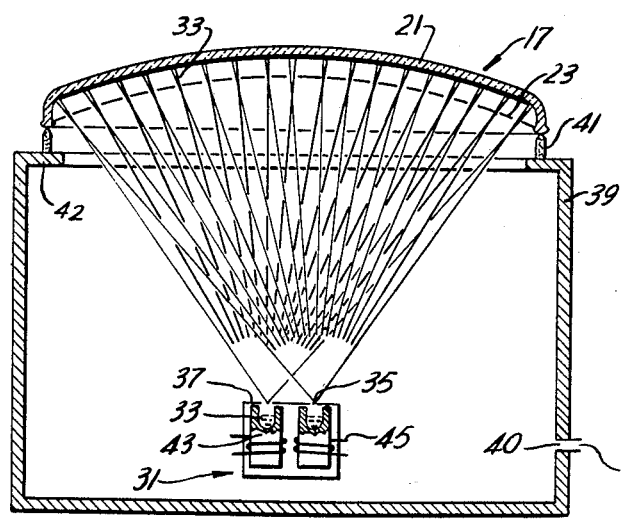
Fig. 2 shows the vaporizing step utilized during formation of a screen adapted for use with the tube shown in Fig. 1.

Referring to Fig. 2, an apparatus is shown which is capable of producing the luminescent material dots at the required position. Briefly, a substantially point source vapor generator 31 is shown mounted relative to viewing panel 17 and mask 23 so that the proper luminescent material 33 may be vapor deposited through the apertures in the mask upon the internal surface of face plate 21. The point source of the vapor is formed by means of limited orifices 35 in chamber 37. Generator 31 is so positioned that each orifice is located during processing of the screen at substantially the same space position as the electron beam center of deflection will be in the operating tube. By application of this process, it can be seen that the phosphor dots will be formed by an issuance of luminescent material vapor through the mask apertures at the same angle as the electron beams will travel during the scanning movement. The relative positions of face plate 21 and mask 23 and the spacing between these components is maintained substantially the same during screen processing as will exist after the tube has been constructed.

Vapor generator 31 is positioned within an enclosure 39 formed with an outlet 40 leading to a vacuum pump so that the enclosure may be evacuated prior to the vaporizing process. A resilient washer or rim 41 serves as a temporary seal between the shoulder 42 of enclosure 39 in addition to performing the function of an aligning or indexing member for viewing panel assembly 17 relative to the enclosure and generator 31. This structure provides for easy positioning and removal of viewing panel assembly 17 from enclosure 39. A plurality of boats 43, one associated with each luminescent material and each orifice 35, is mounted within chamber 37. Two of the three boats and orifices needed to produce a tri-dot or tri-stripe screen are shown for simplicity. Electrical heating coils 45 are positioned relative to the boats to produce the temperature needed to vaporize the luminescent materials. The orifice diameter, boat configurations and spacing from chamber 37, and the amount of heat generated by resistance wires 45 determine the vapor processing characteristics.

Figure 6:
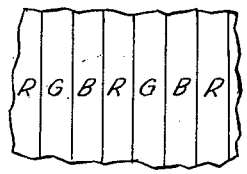
Fig. 6 illustrates a small section of a multiple stripe or bar type color display screen.
Figure 3:
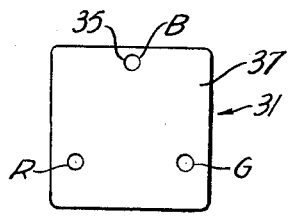
Figs. 3 and 4 illustrate two embodiments of the vapor generators used during the screen forming process and illustrate the relative positions of the generator orifices with respect to one another.
Figure 4:
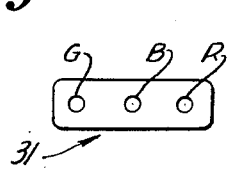

Vapor generator 31 may be formed with a single chamber 37 having a plurality of properly arranged orifices 35, or it may comprise a plurality of separate generators each with individual chambers and orifices. Referring to Fig. 3, it can be seen that generator 31 is formed to produce a screen pattern of the type shown in Fig. 5. The orifices associated with the red, green and blue luminescent materials, R, G and B respectively, are arranged equidistant from the axis of panel assembly 17 and 120° apart. Upon vaporization of the luminescent materials from the generator, the screen pattern dots will be formed as a plurality of triads arrayed in accordance with the pattern in Fig. 5. In order to produce an image display screen employing a series of red, blue and green luminescent strips or bars as shown in Fig. 6, the generator 31 may be formed with three equally spaced aligned orifices as indicated in Fig. 4. Mask 23 is formed with a plurality of substantially parallel elongated openings in order to produce a screen of this type.

The vapor mask 23 employed in the process may be the aperture mask used in the finished tube, if desired. However, it is to be understood that a vapor mask may be fabricated solely for the purpose of being utilized in the screen forming operation. Generally, face plate 21 and the mask are held together by means of spring clips, and can be easily assembled and dis-assembled from one another. If the aperture and vapor mask are one and the same, the mask requires cleaning prior to insertion into the tube.

The process of forming an image display luminescent screen will now be described in more detail. The luminescent materials 33 are initially placed in their respective boats 43 and face panel assembly 17 is positioned over the vapor generator 31 and upon washer 41. Suitable luminescent materials such as the red phosphor, zinc phosphate, the green phosphor, zinc orthosilicate and the blue phosphor, zinc sulfide may be used. After mask 23 and face plate 17 have been properly aligned relative to generator 31, the enclosure 39 is evacuated through opening 40 and electric resistance coils 45 are energized. The heated wire raises the temperature of the luminescent materials to approximately 1100° C., at which time they vaporize and deposit on face plate 21. This vaporization step may occur simultaneously for each of the luminescent materials used, or the individual materials may be vaporized in sequence. In either instance, each luminescent material vapor travels from its substantially point source origin at its orifice of chamber 37 and proceeds to move through the apertures in mask 23 at an angle so as to form configurations on face plate 21 arranged in accordance with the proper luminescent pattern. For instance, a red luminescing pattern of dots will be formed which is offset from the blue and green patterns respectively, as shown in Fig. 5.

For certain types of phosphors or luminescent materials such as those included in the sulfur-selenium dominated group, it has been found advantageous to evaporate a flux such as sodium chloride along with the phosphor. This flux is believed to promote lower temperature crystallization of the phosphor. When a flux is used, it may be placed in boats 45 along with the phosphor material 33 prior to vaporization. Also, when using certain types of phosphors such as zinc sulfide, it has been found that a higher level of brightness can be achieved if the activator is vaporized subsequent to the luminescent material vaporizing step. Accordingly, the same chambers 37 or additional chambers may be used to vapor deposit the activator, which may be silver or a sliver salt when used with a zinc sulfide phosphor.

After the screen patterns have been formed, the viewing panel 17 is removed from enclosure 39 and placed in a furnace for firing in vacuum or in air at temperatures ranging from 450° to 1100° C. This firing step promotes activation of the phosphor or luminescing material crystals, thereby rendering them light emissive upon excitation by electrons, photons, electric fields, etc.

Figure 7:
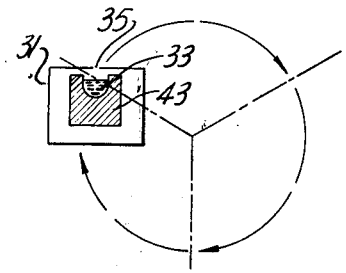
Fig. 7 shows an alternative method of positioning a vapor generator adapted for use with the structure shown in Fig. 2.

Although a vapor generator having a single chamber 37 has been illustrated, it is to be understood that various modifications may be employed to achieve the desired process. For instance, a vapor generator 31 comprising a single boat 43 and a single orifice 35 may be used to produce the entire screen. After each separate phosphor vaporization process, boat 43 can be filled with a subsequent and different phosphor material 33 and the generator rotated approximately 120° from its previous position as shown in Fig. 7. Utilization of a structure of this type would provide similar results to those achieved by the multiple orifice generator 31 shown in Fig. 3. Also, three enclosures 39 may be employed, each of which is formed to house a separate generator to provide the pattern for a single color luminescing material.

Although several embodiments of the invention have been shown and described, it will be apparent to those skilled in the art that various changes and modifications may be made therein without departing from the scope of the invention as defined by the appended claims.

What is claimed is:

1. A process of forming a screen pattern on the viewing panel of an image display device comprising the steps of positioning a viewing panel assembly in spaced relationship with a substantially point source luminescent material vapor generator, said assembly having an apertured vapor mask spaced from the viewing panel and disposed intermediate said generator and said panel, and vapor depositing the luminescent material onto the panel from said generator through the apertures in said vapor mask to form the pattern.

2. A process of forming a screen pattern on the viewing panel of an image display device comprising the steps of depositing a luminescent material into a substantially point source vapor generator, positioning a viewing panel assembly in spaced relationship and in prescribed alignment with said generator, said assembly having an apertured vapor mask spaced from the viewing panel and disposed intermediate said generator and said panel, and vapor depositing said luminescent material onto the panel from said generator through the apertures in said vapor mask to form the pattern.

3. A process of forming a screen pattern on the viewing panel of an image display device comprising the steps of depositing a luminescent material into a substantially point source vapor generator, positioning a viewing panel assembly in spaced relationship and in prescribed alignment with said generator, said assembly having an apertured vapor mask spaced from the viewing panel and disposed intermediate said generator and said panel, vapor depositing said luminescent material onto the panel from said generator through the apertures in said vapor mask to form the pattern, vapor coating said pattern with a luminescent material activator, and heating said activator coated pattern.

4. A process of forming a screen on the viewing panel of an image display device comprising the steps of vapor depositing configurations of a first luminescent material having given color emissivity properties onto the viewing panel from a substantially point source luminescent material vapor generator through an apertured vapor mask to form a first luminescent material pattern, and vapor depositing configurations of a second luminescent material having color emissivity properties different from said first luminescent material upon the panel from a substantially point source material vapor generator through an apertured vapor mask to form a second luminescent material pattern offset from said first pattern.

5. A process of forming a screen on the viewing panel of an image display device comprising the steps of depositing first and second luminescent materials having different color emissivity properties into a substantially point source vapor generator having first and second orifices respectively, said orifices being offset from one another, positioning a viewing panel assembly in spaced relationship and in prescribed alignment relative to said generator, said assembly having an apertured vapor mask spaced from the viewing panel and disposed intermediate said generator and said panel, and vapor depositing configurations of said luminescent materials onto the panel from said point source generator through the apertures in said vapor mask to form first and second luminescent material configuration patterns offset from one another.

6. A process of forming a screen on the viewing panel of an image display device comprising the steps of depositing first and second luminescent materials having different color emissivity properties into a substantially point source vapor generator having first and second orifices respectively, said orifices being offset from one another, positioning a viewing panel assembly in spaced relationship and in prescribed alignment relative to said generator, said assembly having an apertured vapor mask spaced from the viewing panel and disposed intermediate said generator and said panel, and vapor depositing configurations of said luminescent materials in sequence onto the panel under vacuum from said point source generator through the apertures in said vapor mask to form first and second luminescent material configuration patterns offset from one another.

7. A process of forming a screen on the viewing panel of an image display device comprising the steps of depositing first and second luminescent materials having different color emissivity properties into a substantially point source vapor generator having first and second orifices respectively, said orifices being offset from one another, positioning a viewing panel assembly in spaced relationship and in prescribed alignment relative to said generator, said assembly having an apertured vapor mask spaced from the viewing panel and disposed intermediate said generator and said panel, and vapor depositing configurations of said luminescent materials substantially simultaneously onto the panel under vacuum from said point source generator through the apertures in said vapor mask to form first and second luminescent material configuration patterns offset from one another.

8. A process of forming a screen on the viewing panel of an image display device comprising the steps of positioning a viewing panel, a substantially point source luminescent material vapor generator and a vapor mask in spaced relationship and in prescribed alignment relative to one another, vapor depositing a first luminescent material having given color emissivity properties onto the panel from said generator through the apertures in said vapor mask to form a first luminescent amterial pattern, positioning said viewing panel, a substantially point source luminescent material vapor generator and a vapor mask in said spaced relationship and offset from said prescribed alignment, and vapor depositing a second luminescent material having different color emissivity properties from said first luminescent material onto the panel from said generator through the apertures in said vapor mask to form a second luminescent material pattern offset from said first pattern.

References Cited in the file of this patent

UNITED STATES PATENTS

| | | |
|---|---|---|
| 2,600,579 | Ruedy et al. | June 17, 1952 |
| 2,727,828 | Law | Dec. 20, 1955 |
| 2,733,164 | Smith | Jan. 31, 1956 |
| 2,757,103 | Briggs et al. | July 31, 1956 |
| 2,789,062 | Cusano et al. | Apr. 16, 1957 |